(12) United States Patent
Katcha (10) Patent No.: US 11,611,220 B2
(45) Date of Patent: Mar. 21, 2023

(54) SYSTEMS AND METHODS FOR CONNECTING ENERGY SOURCES TO POWER DISTRIBUTION NETWORK

(71) Applicant: Present Power Systems, LLC, Milwaukee, WI (US)

(72) Inventor: Jason Stuart Katcha, Whitefish Bay, WI (US)

(73) Assignee: Present Power Systems, LLC, Milwaukee, WI (US)

( * ) Notice: Subject to any disclaimer, the term of this patent is extended or adjusted under 35 U.S.C. 154(b) by 154 days.

(21) Appl. No.: 14/986,273

(22) Filed: Dec. 31, 2015

(65) Prior Publication Data

US 2017/0194794 A1    Jul. 6, 2017

(51) Int. Cl.
| | | |
|---|---|---|
| *H02J 5/00* | (2016.01) | |
| *H02J 3/38* | (2006.01) | |
| *H02M 3/335* | (2006.01) | |
| *H02J 7/35* | (2006.01) | |
| *H02M 7/48* | (2007.01) | |

(Continued)

(52) U.S. Cl.
CPC .............. *H02J 3/388* (2020.01); *H02J 3/381* (2013.01); *H02J 5/00* (2013.01); *H02J 7/35* (2013.01); *H02J 9/062* (2013.01); *H02M 3/33507* (2013.01); *H02M 7/4807* (2013.01); *H02J 9/063* (2020.01); *H02J 2300/24* (2020.01); *H02J 2300/28* (2020.01); *H02M 1/007* (2021.05); *Y02B 10/70* (2013.01); *Y02E 10/56* (2013.01); *Y02E 10/76* (2013.01)

(58) Field of Classification Search
CPC ....................................................... H02J 5/00
USPC .......................................................... 307/17
See application file for complete search history.

(56) References Cited

U.S. PATENT DOCUMENTS

| | | | |
|---|---|---|---|
| 7,465,872 B1 * | 12/2008 | de Rooij | H02J 3/381 |
| | | | 136/243 |
| 8,023,295 B1 | 9/2011 | Shekhawat et al. | |
| 2009/0302686 A1 | 12/2009 | Fishman | |

(Continued)

FOREIGN PATENT DOCUMENTS

| | | |
|---|---|---|
| EP | 1531542 A2 | 5/2005 |
| EP | 2256894 A2 | 1/2010 |

(Continued)

*Primary Examiner* — Daniel Kessie
*Assistant Examiner* — Dru M Parries
(74) *Attorney, Agent, or Firm* — Fitch, Even, Tabin & Flannery LLP (57) ABSTRACT

A device includes at least one isolating transformer. An input is coupled to the at least one isolating transformer and configured to receive input from an energy source. At least one power switch is coupled to the isolating transformer. A diode is coupled to the at least one isolating transformer. An energy storage medium is coupled to the diode. An inverter includes one or more inverter switches, an inverter input, and an inverter output. The inverter input is coupled to the diode and the energy storage medium. The inverter output is configured to be coupled to the power network, and the inverter is configured to create AC power for distribution to the power network. A controller is configured to modulate the at least one power switch to control power flow from the input and to modulate the state of the inverter switches to control power flow to the power network.

12 Claims, 6 Drawing Sheets

(51) Int. Cl.
  *H02J 9/06* (2006.01)
  *H02M 1/00* (2006.01)

(56) References Cited

U.S. PATENT DOCUMENTS

| | | | |
|---|---|---|---|
| 2013/0027979 A1 | 1/2013 | Phadke | |
| 2014/0062198 A1* | 3/2014 | Luo | H02J 3/46 |
| | | | 307/42 |
| 2014/0078791 A1 | 3/2014 | Gurudasani et al. | |
| 2014/0375131 A1 | 12/2014 | Spanoche et al. | |
| 2015/0078049 A1 | 3/2015 | Yoo et al. | |
| 2015/0288188 A1 | 10/2015 | Keshner et al. | |
| 2016/0344188 A1* | 11/2016 | Carlson | G05B 15/02 |
| 2017/0133879 A1* | 5/2017 | Eckhardt | H02J 13/0096 |

FOREIGN PATENT DOCUMENTS

| | | |
|---|---|---|
| EP | 2701264 A1 | 2/2014 |
| WO | WO2013127230 A1 | 9/2013 |
| WO | WO2014203561 A1 | 12/2014 |

* cited by examiner

SYSTEMS AND METHODS FOR CONNECTING ENERGY SOURCES TO POWER DISTRIBUTION NETWORK

TECHNICAL FIELD

This patent disclosure relates generally to systems and methods for interfacing with one or more power sources, and more particularly, to methods and apparatuses for connecting one or more energy sources to a power distribution network, such as a utility grid.

BACKGROUND

Grid tie inverters are utilized to receive energy from DC power sources such that the energy may be used by a local system in which the grid tie inverter is installed and converted to alternating current (AC) such that the sources may be connected to a power grid or network. Grid tie inverters may also be coupled to an energy storage device (e.g. a battery) that allows energy generated by a DC source to be stored and used locally for a particular time period. After the time period, unused energy is provided to the power grid. In this manner, the DC power source benefits the local system while also providing a specific benefit to the overall system.

A problem exists, however, in that existing grid tie inverters and energy storage devices are not integrated together in an economic fashion and do not provide sufficient isolation between their energy storage device and their DC input. Such lack of isolation is problematic because it can cause damage to the energy storage devices and the DC power sources. Accordingly, supplemental safety equipment is needed to attach a grid tie inverter to a power source. Another problem exists in that existing grid tie inverters designs do not efficiently control operations between sources and power grids. This combination of supplemental safety equipment and inefficient control results in grid tie inverters not being a cost effective and simple approach for smaller scale energy producers, such as residences and small businesses.

Accordingly, the present disclosure is directed to overcoming one or more of the shortcomings set forth above.

SUMMARY

In one aspect, the disclosure is directed at a device for controlling power flow between at least one energy source and a power network. The device includes at least one isolating transformer. At least one input is coupled to the at least one isolating transformer and configured to receive input from an energy source. At least one power switch is coupled to the isolating transformer. A diode is coupled to the at least one isolating transformer. An energy storage medium is coupled to the diode. An inverter includes one or more inverter switches, an inverter input, and an inverter output. The inverter input is coupled to the diode and the energy storage medium. The inverter output is configured to be coupled to the power network, and the inverter is configured to create AC power for distribution to the power network. A controller is configured to modulate the at least one power switch to control power flow from the input and to modulate the state of the inverter switches to control power flow to the power network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

DETAILED DESCRIPTION

Figure 1:
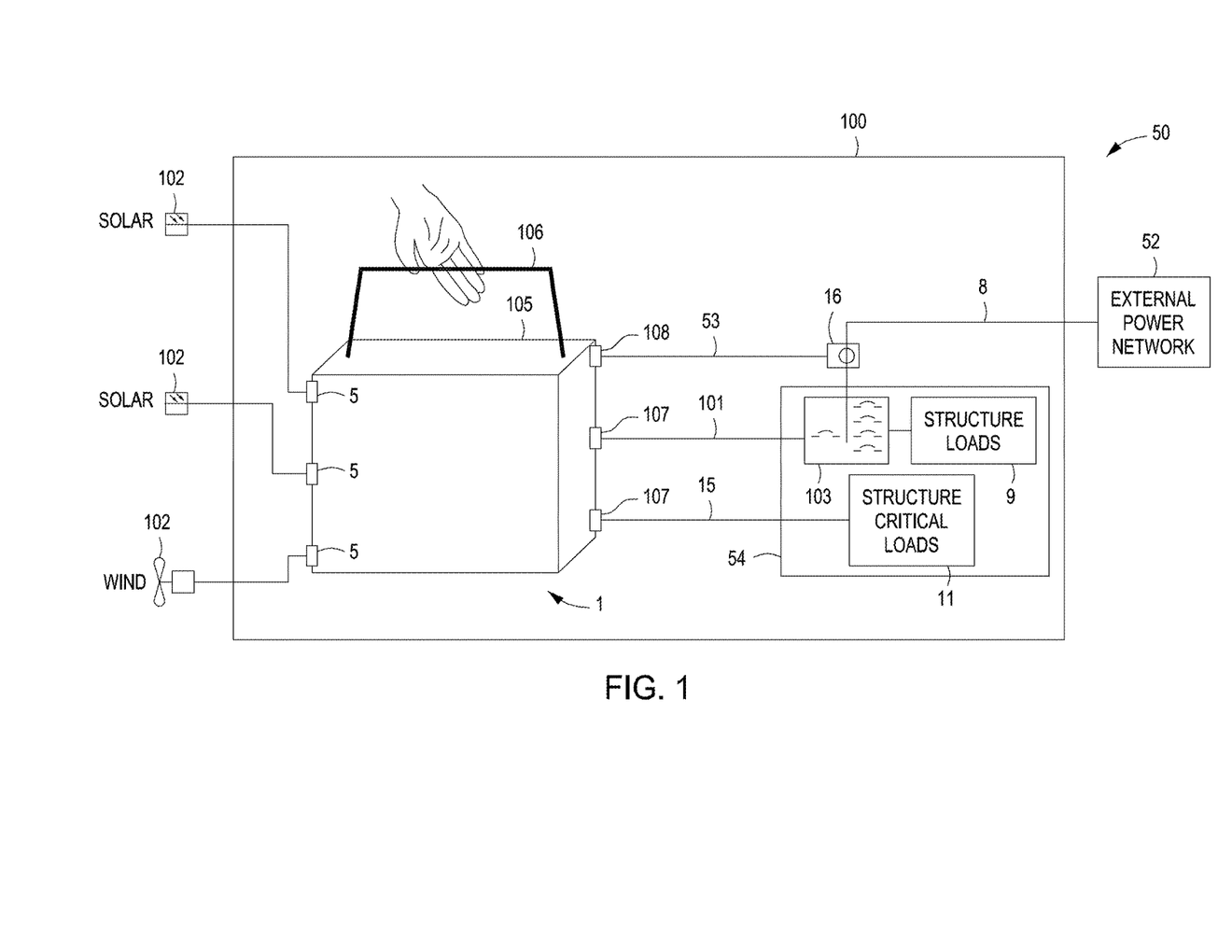
FIG. 1 is a functional block illustration of an exemplary hybrid energy system in accordance with the present disclosure.

Referring to FIG. 1, an exemplary hybrid energy system 50 is shown for illustrative purposes. System 50 in one example comprises one or more energy sources 102, a structure 100, and an external power network 52.

Energy sources 102, in one embodiment, are renewable energy sources, such as wind, solar, hydropower, geothermal, and biological energy sources. However, these examples are provided for illustrative purposes only and should not be viewed as limiting. Energy sources 102, in one example, are configured to provide energy to the internal power network 54 of the structure 100 and/or external power network 52 as will be discussed further herein. In one example, an energy source 102 may be configured such that it has a maximum voltage. Such a maximum voltage may be determined by regulatory or zoning requirement. For instance, the ceiling may be twenty-five (25) volts or less. In one example, an energy source 102 may comprise a plurality of energy sources, such as solar panels, that are configured in parallel with each other. The plurality of parallel energy sources may have an output voltage that has a maximum voltage that is dictated by regulatory or zoning requirements.

Structure 100, in one embodiment, comprises a unit that includes an internal power network 54 or power distribution infrastructure. In one example, structure 100 is a building. Such a building may comprise one or more dwellings and/or businesses. Structure 100 may be an outdoor venue with a power distribution network, such as a campground, fair ground, or outdoor entertainment venue. Structure 100 may be a combination of an indoor and outdoor venue, such as a stadium. It should be understood that the preceding examples are provided for illustrative purposes only and should not be viewed as limiting the scope of the present disclosure.

Referring further to FIG. 1, structure 100 is connected to external power network 52 through one or more interfaces 8. Structure 100 may utilize external power network 52 to provide power to structure loads 9 and structure critical loads 11. Structure 100 may include an internal power network 54. Internal power network 54, in one example, is utilized to distribute power to structure loads 9. Structure loads 9 are loads that are within or/are associated with structure 100. For example, structure loads 9 may include loads, such as heating, cooling, refrigeration, power outlets, lighting, and the like. Structure critical loads 11, in one example, are loads that are critical to the operation of structure 100 such that it is desirable, in the event of a failure of the external power network 52, to prioritize these loads over other loads. For example, in a large urban office building, lighting may be a structure critical load 11. In a perishable goods storage unit, the refrigeration unit may be a structure critical load 11.

Referring further to FIG. 1, power connection 101, in one example, distributes power to the internal power network 54 with structure loads 9 through a grid connection device 103. In one example, a grid connection device comprises a device that provides over-current protection to structure 100. An example of a grid connection device 103 is a circuit breaker panel.

Grid connection device 103 in one example also is connected to power connection interface 8 such that structure 100 may provide and/or receive power from external power network 52. In one embodiment, grid connection device 103 is connected to interface 8 through current sensor 16. Current sensor 16 measures the amount of current that is sent to and/or received from external power network 52 and may be used to control the amount of current that is sent to and/or received from external power network 52. For instance, current sensor 16 may prevent current from reaching interface 8 during operational modes when it is undesirable for structure 100 to transmit power form energy sources 102 to the external power network 52. In another example, current sensor 16 may allow current to reach interface 8 during operational modes when it is desirable for structure 100 and/or energy sources 102 to provide power to external power network 52. Current sensor 16 provides current sense information through controller external current sensor interface 53, to a controller 104 (FIG. 2) of grid tie system (GTS) 1, as will be discussed further herein. In one example, current sensor 16 is a high frequency current sensor that has a sufficiently high frequency response such that it can provide feedback to controller 104 that enables controller to provide real-time or near real-time control of the output waveform of GTS 1. In one example, current sensor 16 has a frequency response of 300 Hz.

Figure 2:
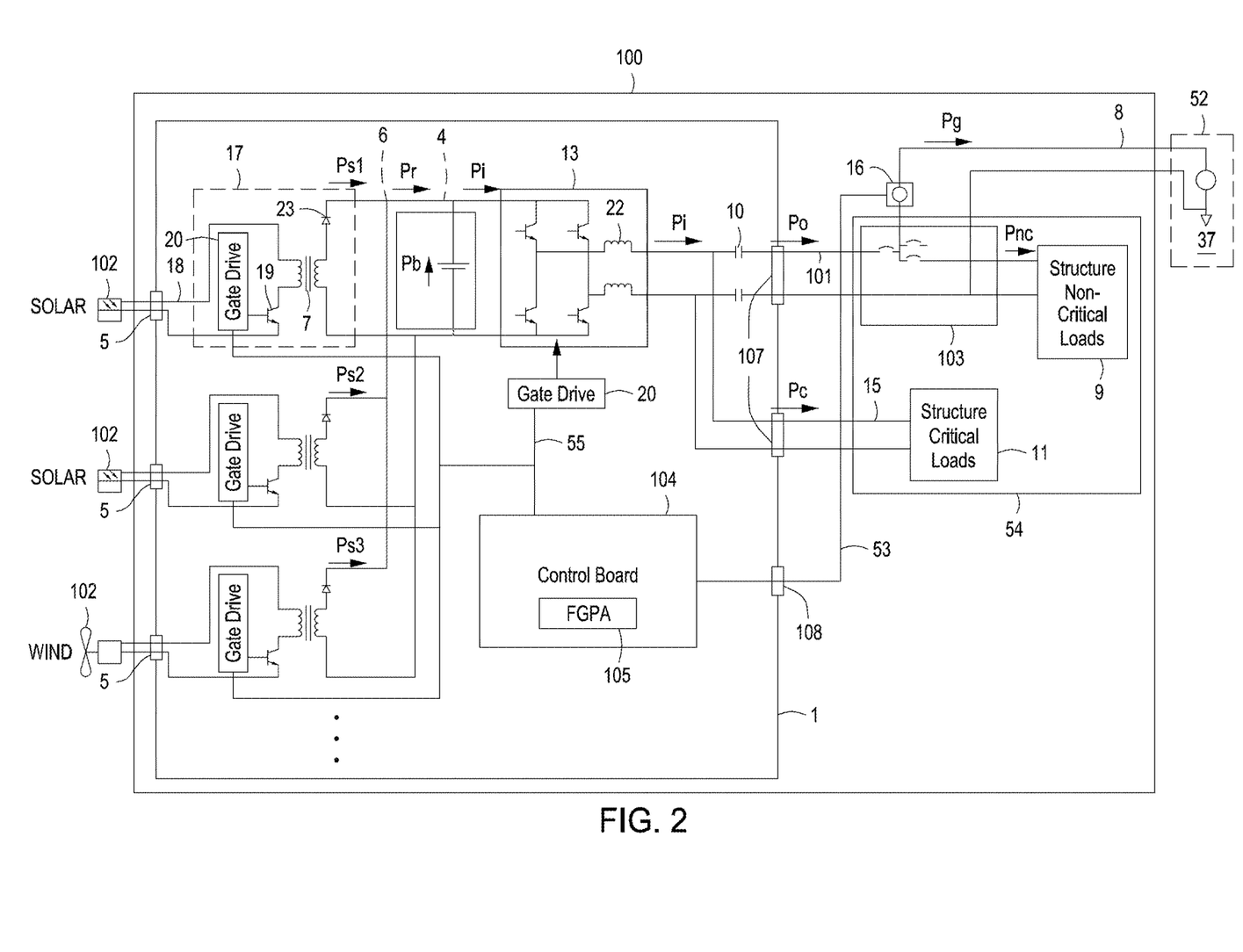
FIG. 2 is a schematic illustration of the hybrid energy system of FIG. 1.

Referring now to FIG. 2, an illustrative embodiment of GTS 1 is now provided for illustrative purposes. GTS 1 in one example may include one or more input ports 5 and one or more output ports 107. GTS 1 may be coupled to energy sources 102 through input ports 5 and may be coupled to controller external current sensor interface 53, controller gate drive interface 55, power output 101 to internal power network 54, and critical load output 15 through output ports 107. In additional embodiments, controller 104 may be connected to other various sensors (not shown) internal to GTS 1 including, but not limited to, sensors to measure voltages and currents of the energy sources, voltages and currents of the isolation transformers, voltage and current of the energy storage medium, voltages and currents of the inverter, and voltages and currents of the outputs 107; and further may use these sensed quantities to control the power flow from the energy sources and the power flow to and from the inverter. In one embodiment GTS 1 is a portable unit that includes a housing 105 and a handle 106.

As will be discussed further herein, GTS 1 receives energy from energy sources 102. GTS 1 may store the received energy in an energy storage medium (for later use) and/or convert received energy to AC power, which may be distributed to structure loads 9, structure critical loads 11, and/or external power network 52. In one example, in the event of failure of external power network 52, GTS 1 may distribute energy from energy sources 102 and/or from an energy storage medium to structure critical loads 11 over critical load interface 15. In this example it may be necessary to disconnect from power output 101 by means of opening contactor 10 in order to not have power flow to external power network 52. In another example, GTS 1 may be utilized to store energy from energy sources 102 during a period of low demand and utilize stored energy to provide energy to structure loads 9 during a period of high demand. In one example, at the end of a period of high demand, if there is excess energy stored in GTS 1, GTS 1 may distribute the excess energy to external power network 52 through interface 8.

Referring further to FIG. 1, in one embodiment, the external power network 52 is a utility grid, such as a utility grid that is used to provide electricity to a particular geographic area. For example, the external power network 52 may be the utility grid of North America, Europe, Asia, Africa, Australia, or geographical portions of the same.

Referring to FIG. 2, an exemplary embodiment of GTS 1 is now provided for illustrative purposes. In one example, GTS 1 includes one or more input stages 17, a DC link 6, energy storage medium 4, inverter 13 with filter inductor 22, a contactor 10, and a control board 104.

Input stage 17, in one example, is utilized to isolate energy storage medium 4 from one or more input sources 102. In another example, input stage 17 is utilized to charge energy storage medium 104. In another example, magnetizing inductance from input stage 17 is utilized to control the power flow from the input sources 102. It should be noted that the preceding examples are not mutually exclusive.

Referring further to FIG. 2 an exemplary embodiment of input stage 17 is now described for illustrative purposes. It should be noted that the components and architecture of input stage 17 have been selected to demonstrate one embodiment of input stage and should not construed as limiting the disclosure solely to what is depicted therein. Input stage 17, in one example, includes an input 18, transistor 19, gate drive 20, transformer 7, and diode 23. Input 18 in one example is coupled to an energy source 102 and receives a DC voltage. Transformer and transistor 19 receive the DC voltage. Gate drive 20 receives a control input from controller 104 and switches the transistor 19 on and off. When the transistor 19 is on, the current in magnetizing inductance of the transformer 7 is increased. When the transistor 19 is off the current in magnetizing inductance is decreased and the energy is transferred to the DC link 4 through the diode 23. The resulting output power is referred to as Ps. Each input stage 17 has an output power Ps that is received at a DC link 6. The topology of input stage 17 is sometimes referred to as a "fly-back converter".

Referring further to FIG. 2, DC link 6, in one example, receives the output Ps from each input stage 107. The outputs Ps are combined together to form an output Pr that is used to charge energy storage medium 4 or deliver power to the inverter 13.

Referring further to FIG. 2, energy storage medium 4, in one example, is a device that is used to store energy. Such devices include, but are not limited to, a battery, capacitor, fly-wheels, thermal cells, fuel cells, etc. Energy storage medium 4 is employed to provide power to structure loads 9. In one embodiment, energy storage medium 4 provides power to structure loads 9 that supplements the power provided by external power network 52. In another embodiment, energy storage medium 4 provides power to structure critical loads 9 when external power network 52 is unavailable. In another embodiment, energy storage medium 4 provides excess power to external power network 52. An entity who owns or operates structure 100 may receive consideration in exchange for providing power to external power network 52. The output of energy storage medium 4 is referred to as Pb.

Referring further to FIG. 2, inverter 13 receives the output Pr from the input stages 17 and/or the output Pb from energy storage medium 4. Inverter 13, in one example, is a grid tie inverter with filter inductor 22. Inverter 13 in one embodiment converts the Pr and/or Pb to alternating current (AC). The output of inverter 13 is sent to output ports 107 through contactor 10, where it is received by power output 101 and/or critical load output 15.

Referring further to FIG. 2, controller 104 may include one or more field programmable gate arrays (FPGAs), microprocessors, a memory, a data storage device, a communications hub, and/or other components known in the art. Specifically, controller 104 may monitor one or more parameters of GTS 1 and may affect the operation of input stages 17, inverter 13. It is contemplated that controller 104 may be integrated within a general machine control system capable of controlling additional various functions a system with which it may be associated. Controller 104 may be configured to receive input signals from one or more sensors, perform one or more algorithms to determine appropriate output signals, and may deliver the output signals to affect control of input stages 17 and inverter 13. It is contemplated that controller 104 may receive and deliver signals via one or more communication lines, such as controller current sensor interface 53 and controller gate drive interface 55.

In one exemplary embodiment controller 104 utilize current sensor 16 to control power flow to and from the utility external power network. Controller 104 may sense current from current sensor 16 and deliver excess power from energy sources 102 (i.e. that which is not used by structure loads 9 or structure critical loads 11) to charge the energy storage medium 4.

Referring further to FIG. 2, an exemplary description of the operation of hybrid energy system 50 will now be provided for illustrative purposes. In one example, DC link 6 is connected directly to energy storage medium 4. Accordingly, the power flow to and from the energy storage medium 4 is controlled by controlling the power flow from energy sources 102 and the power flow through inverter 13.

In one embodiment, the cumulative power Pr from (n) energy sources 102, through input stages 17 and DC link 6, neglecting any power losses, is:

$$Pr = Ps1 + Ps2 + \ldots Ps(n) \quad (1)$$

The power Pi through inverter 13 is equal to the sum of Pr and the power Pb from the energy storage medium 4, which when neglecting any power losses, is:

$$Pi = Pr + Pb \quad (2)$$

The power Pi through of the inverter 13 also equals the sum of the power to the external power network 52 (Pg), the power to the structure loads 9 (Psc), and the power to the structure critical loads 11 (Pc):

$$Pi = Pg + Psc + Pc \quad (3)$$

By controlling Pi and Pr, controller 104 may control the power flow into and out of the energy storage medium 4. Also, by utilizing the current sense information of current sensor 16, the controller may limit the inverter power Pi such that the power Pg delivered to the external power network 52 is never positive, while the power (Pnc+Pc) delivered to the internal power network 54 may be maximized. The ability to prohibit power delivery to the external power network 52 while also delivering maximum power to the internal power network 54, may be useful for two reasons. First, the owner of the structure 100 may not be compensated for power delivered to the external power network 52 and therefore may not desire to deliver power to such external power network 52. Second, there may be safety regulations, including, but not limited to UL, NEC or other, that may prohibit delivery of power such an external power network 52. In addition, the current sensor 16 may have a high bandwidth which allows the power Pg delivered to the external power network to be limited in real time and therefore never positive at any time.

Figure 3:
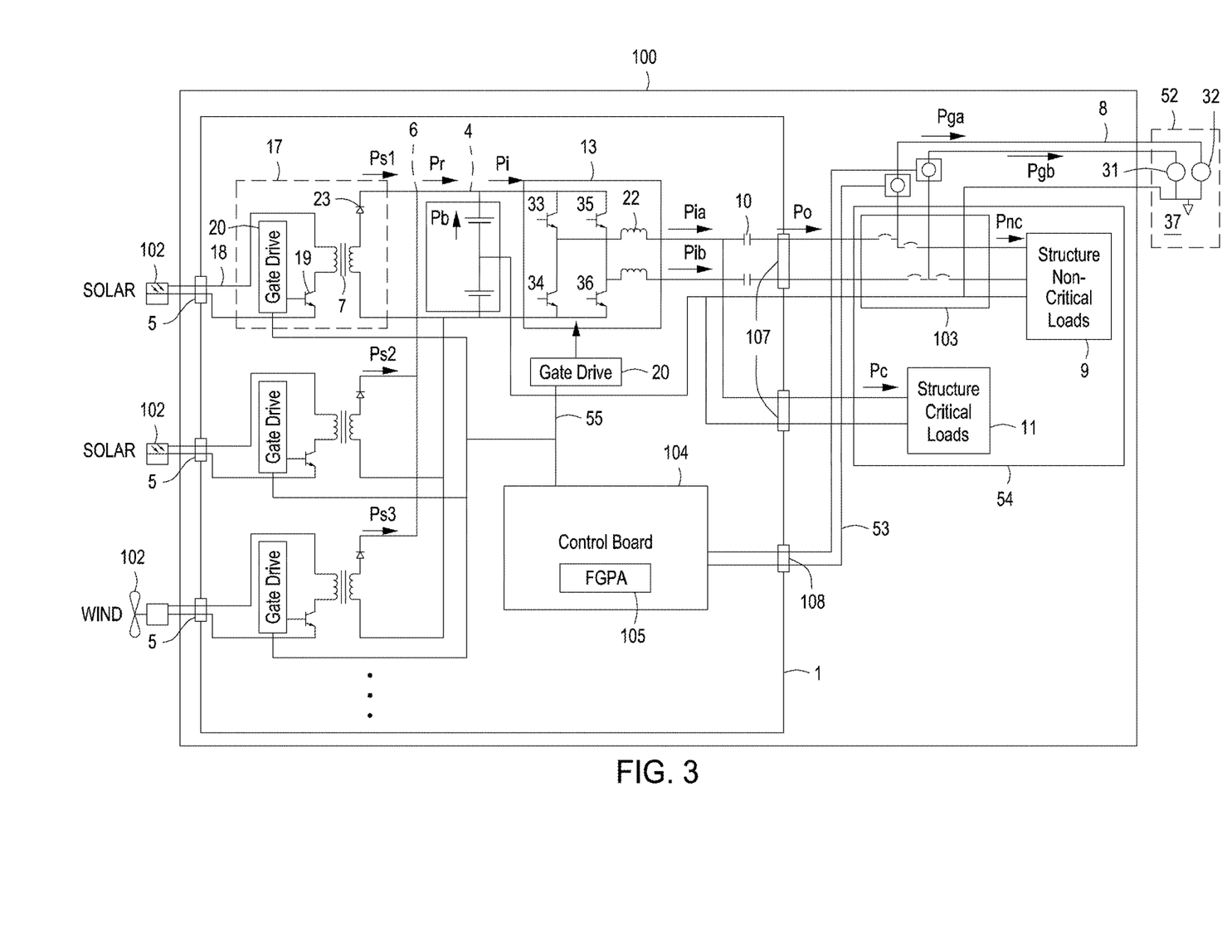
FIG. 3 is a schematic illustration of a further embodiment of the hybrid energy system of FIG. 1.

Referring to FIG. 3, another exemplary embodiment of and operation of hybrid energy system 50 will now be provided for illustrative purposes. The energy storage medium 4 is modified from FIG. 2 by adding a midpoint voltage reference that is electrically connected to the external power network 52 common or neutral point 37. The inverter 13 transistors 33 and 34 form a first phase output and the transistors 35 and 36 form a second phase output where each phase output may be independently controlled to deliver independent output powers 101 and 109. Output powers 101 and 109 are now connected to a two phase power network with internal power network 54 and external power network 52 that has two independent power sources 31 and 32 with neutral point 37. The current in the 2 phases between the internal power network 54 and the external power network 52 are sensed independently by current sensors 16 and 30. The current sense information of both phases may be used by the controller to independently control the two inverter phases to limit power flow to the two phases of the external power grid to be less than zero, while still providing maximum power to the internal power network 54.

Figure 4:
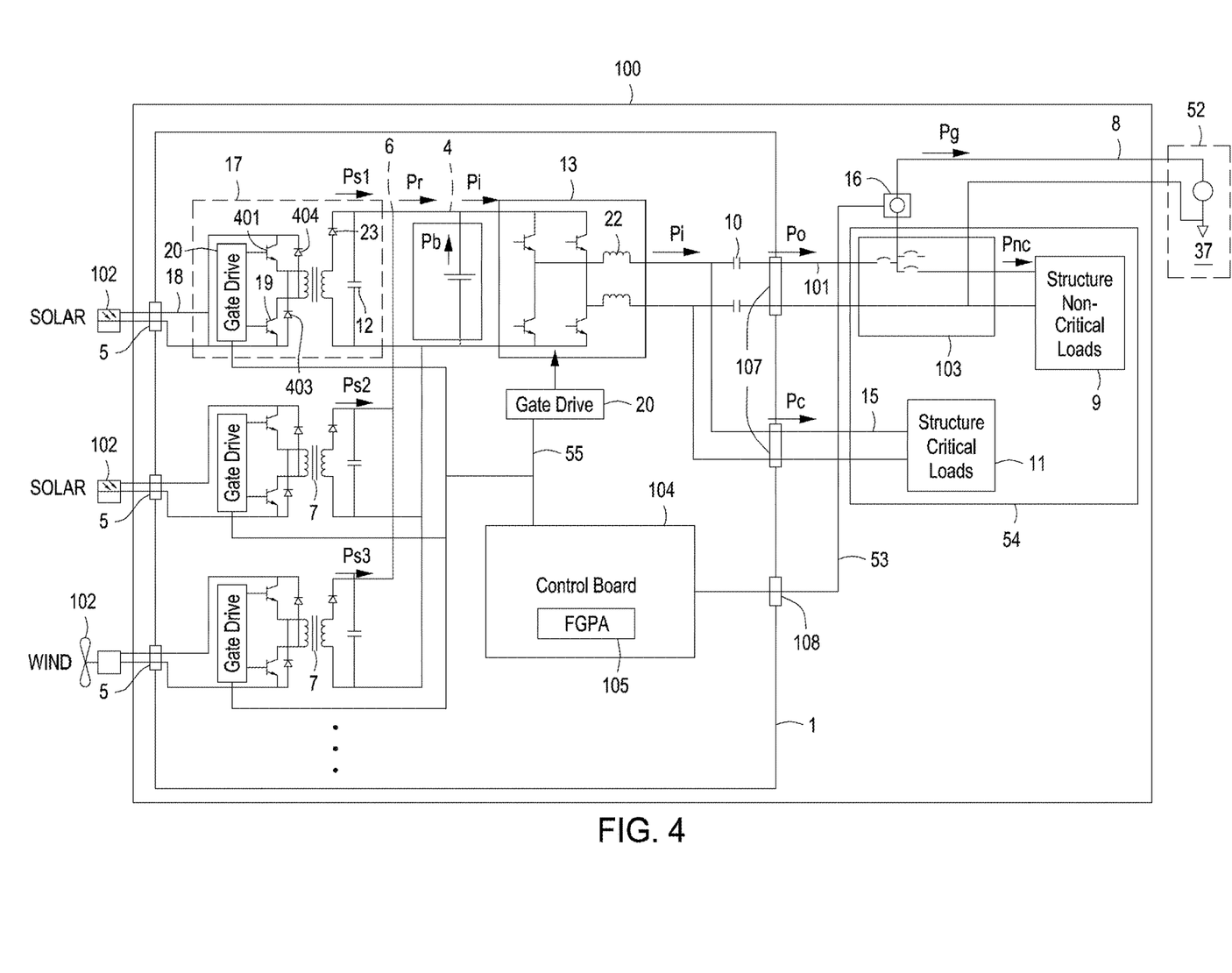
FIG. 4 is a schematic illustration of a further embodiment of the hybrid energy system of FIG. 1.

Referring to FIG. 4, another embodiment and corresponding description of the operation of hybrid energy system 50 will now be provided for illustrative purposes. Input stage 17 is modified from FIG. 2 by the addition of transistor 401, diodes 403 and 404, and capacitors 402 and 12. The transistor 401 turns off synchronously with transistor 19 and works with diodes 403 and 404 to channel energy stored in the leakage inductance to capacitor 402. The capacitor 12 may be used to filter high frequency currents at transformer output.

Figure 5:
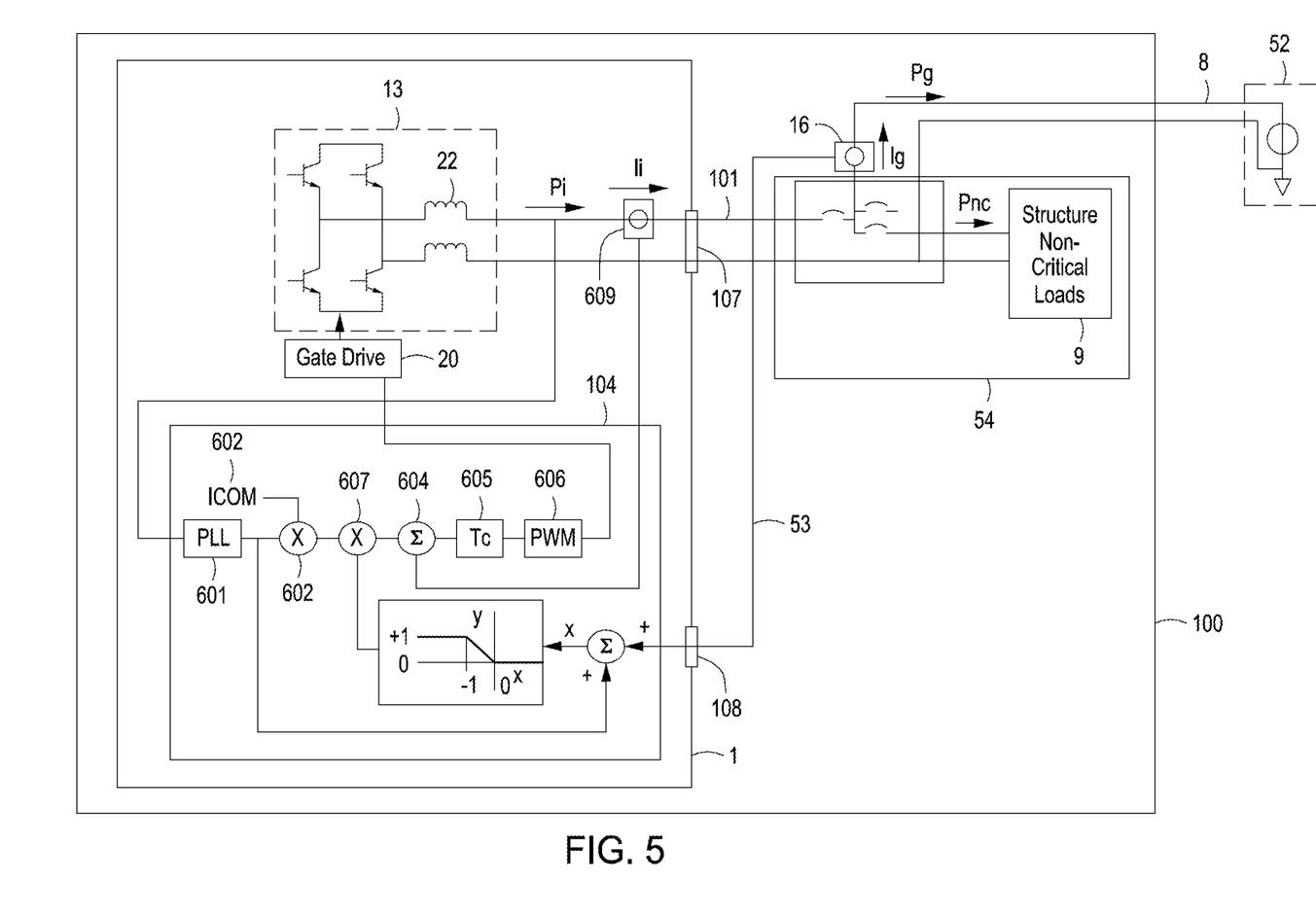
FIG. 5 is a schematic illustration and exemplary control diagram of the hybrid energy system of FIG. 1.

Referring to FIG. 5, an exemplary description of a real time control process will now be provided for illustrative purposes. The voltage of the power network 52 is sensed at the power output 101 and applied to a Phase-Lock Loop (PLL) 601 to create a unity sinewave signal that is multiplied (603) by a current command value 602 to create sinusoidal current reference. This current reference is applied to a current control loop consisting of current sensor 609, error amplifier 604, frequency compensator 605, pulse-width modulator 606 and gate drive 20 that modulates the transistors of inverter 13. The control loop controls the inverter current Ii to be a representation of the sinusoidal current command.

Current sensor 16, summing amplifier 604, look up table 608, and multiplier 607, reduces the output power 101 in order to limit the power to the external grid to be less than zero or some other value. In real time, the current sense information Ig is added by summing amplifier 604 to the unity magnitude sinewave and applied to the look up table 608. Look up table 608 contains a function that is unity when power flow to the external power network 52 is negative. As the power flow to the external power network 52 becomes less negative and close to zero, the look up table 608 output transitions to zero. The look up table output is applied a multiplier 607 that also has an input of the current command sinusoid. The output of the multiplier 607 is applied the error amplifier 604.

Figure 6:
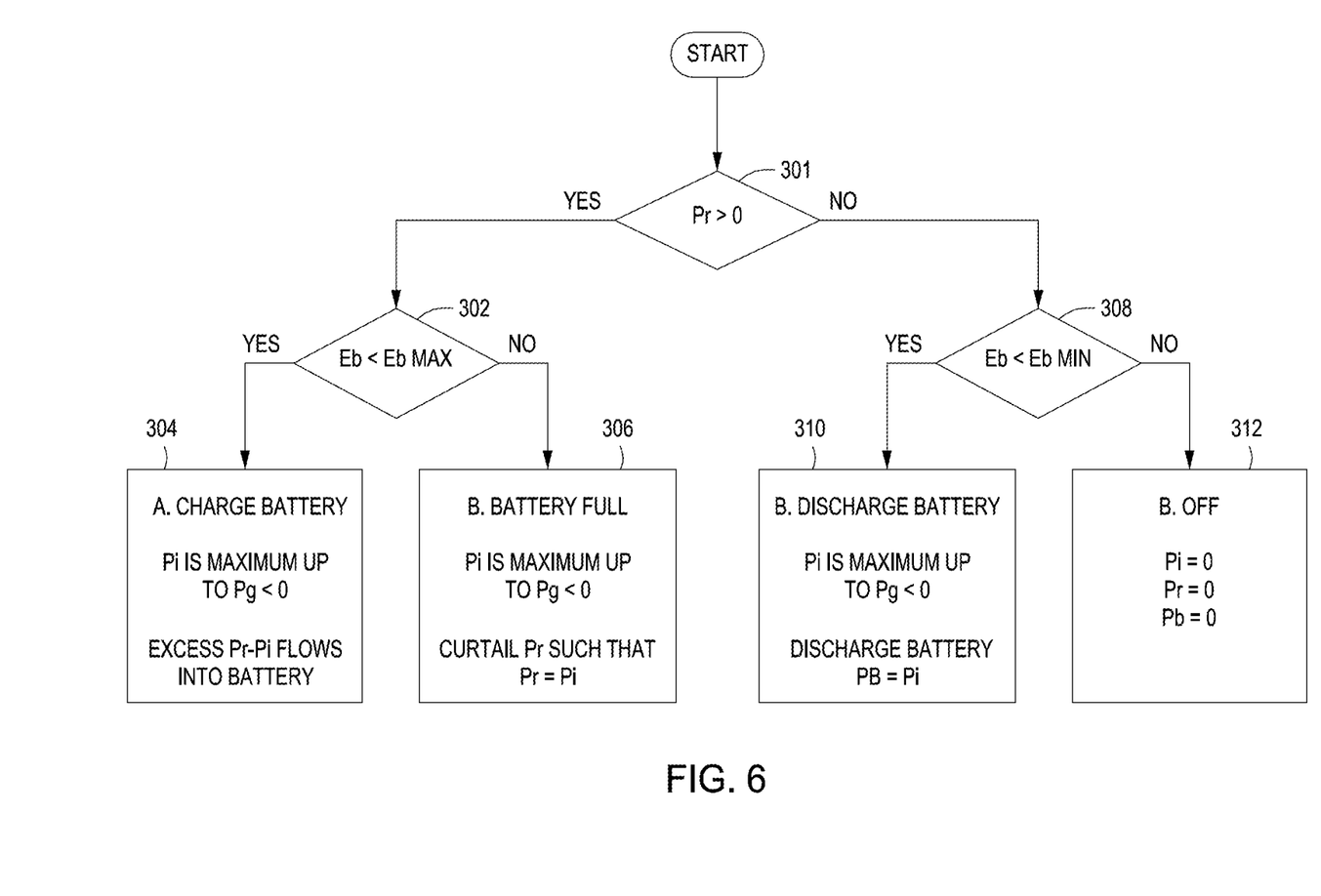
FIG. 6 is schematic illustration of an exemplary control algorithm executable by the controller of FIG. 2.

Referring to FIG. 6, an exemplary process 300 utilized by controller 104 is now described for illustrative purposes.

In step 301, controller 104 determines whether or not the cumulative power Pr from energy sources 102 is positive or negative. If Pr is positive, then in step 302, controller 104 determines whether the state of charge Eb of energy storage device 4 is less than a maximum value Ebmax. If it is less than Ebmax, then controller 104, in step 304, sets Pi to a maximum value up to the point where Pg is zero. Excess power Pr−Pi, which is not used to drive structure loads 9 and structure critical loads 11, charges energy storage medium 4. If, in step 302, the state of charge Eb of energy storage device 4 is not less than Ebmax, then the energy storage medium 4 is full. Accordingly, the controller 10, in step 306, may reduce Pr such that Pr is equal to Pi.

Referring further to FIG. 6, if in step 301, controller 104 determines whether or not the cumulative power Pr from energy sources 102 is zero, then in step 308, controller 104 determines whether the state of charge Eb of energy storage device 4 is greater than a minimum value Ebmin. If the state of charge Eb is more than a minimum Ebmin, then in step 310, controller 104 sets Pi to a maximum value up to the point that Pg is zero and energy storage device 4 is discharged. If, in step 308, controller 104 determines that the state of charge Eb is less than Ebmin, then in step 312, controller 104 sets Pr to off and Pi to off. Accordingly, Pb would then equal 0.

The present disclosure is not limited in any way to the examples, which can be applicable in various forms, as appreciated by one skilled in the art. Therefore, it is to be understood that any terms, phrases, structural and functional details, disclosed herein are merely a basis for the claims and as a representative for teaching one skilled in the art to variously employ the present disclosure.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

One skilled in the art will appreciate further features and advantages based on the described examples. Accordingly, the disclosure is not to be limited by what has been particularly shown and described, except as indicated by the appended claims. Further, although at least one series of steps are presented as an exemplary method of practicing one or more examples described herein, it will be appreciated by those skilled in the art that the steps identified may be practiced in any order that is practicable, including without limitation the omission of one or more steps.

In one aspect, the disclosure is directed at a device for controlling power flow between a plurality of energy sources and a power network. A first input and a second input are each configured to receive input from an energy source. A first isolating transformer is coupled to the first input and a second isolating transformer is coupled to the second input. An energy storage medium is coupled to the first isolating transformer and the second isolating transformer. An inverter is coupled to the first isolating transformer, the second isolating transformer, and the energy storage medium. The inverter utilizes power from at least one of the first isolating transformer, the second isolating transformer, and the energy storage medium to create AC power. A controller that receives input from the first isolating transformer and the second isolating transformer and utilizes the input to control the AC power from the inverter.

I claim:

1. A device configured to be connected to a power network and at least one energy source, the device operable for controlling power flow between the at least one energy source and the power network, the device comprising:
   a battery directly connected to a DC bus without intermediate interface electronics;
   a power input stage comprising at least one input configured to be connected to at least one energy source to receive power from the at least one energy source, at least one isolating transformer coupled to the at least one input, at least one power switch coupled to the isolating transformer, and at least one diode coupled to the at least one isolating transformer and coupled directly to the battery via the DC bus without intermediate interface electronics;
   an inverter comprising one or more inverter switches, an inverter input, and an inverter output, wherein the inverter input is coupled directly to the battery and the at least one diode of the power input stage via the DC bus without intermediate interface electronics, the inverter output is configured to be coupled to the power network, and the inverter is configured to receive DC power from the DC bus and create AC power for distribution to the power network via the inverter output;
   a first output electrically connected to the inverter output and configured to be connected to a critical load;
   a second output electrically connected to the inverter output and configured to be connected to at least one of a non-critical load and an external power network; and
   a controller operably connected to the at least one power switch and the one or more inverter switches, the controller configured to modulate the at least one power switch to control power flow from the at least one input to the DC bus by increasing current in the magnetizing inductance of the isolating transformer when the switch is on with no power flow to a secondary winding of the isolating transformer and decreasing said current when the switch is off with power flow to the secondary winding;
   said controller is configured to modulate the state of the inverter switches to control power flow to and from the power network, the controller configured to control the power flow to and from the battery by controlling the power flowing through each of the power input stage and the inverter,
   wherein controlling power flow to and from the power network includes controlling a current output of the inverter including utilizing current data from at least one current sensor operable to sense current flow between an internal power network and an external power network of the power network and a look up table to control a current sine waveform between the internal power network and the external power network in substantially real-time, the look up table specifying the current output of the inverter as a function of the sensed current flow data, wherein the look up table output is zero where the current flow to the external power network is zero and transitions to unity as the current flow to the external power network becomes increasingly negative.

2. The device of claim 1 wherein the at least one input comprises a plurality of inputs, the at least one isolating transformer comprises a plurality of isolating transformers, and the at least one power switch comprises a plurality of power switches and the at least one diode comprises a plurality of diodes; and the controller is configured to modulate the power switches to control power flow from the plurality of inputs to the DC bus by increasing the currents in the magnetizing inductances of the isolating transformers when the switches are on with no power flow to the secondary windings and decreasing said currents when the switches are off with power flow to the secondary windings.

3. The device of claim 1, wherein the battery has a Lead Acid or Li-ion chemistry.

4. The device of claim 1 further comprising a housing containing the battery, the power input stage, and the inverter.

5. The device of claim 4 wherein the housing is portable, the at least one input of the power input stage removably connectable to the at least one energy source and the inverter output removably connectable to the power network.

6. The device of claim 5 further comprising a handle coupled to the housing.

7. The device of claim 1 wherein the controller is configured to change the state of a switch associated with the second output to selectively permit power to flow through the second output.

8. The device of claim 1 wherein the controller is configured to modulate the state of the inverter switches to control the flow of power to the external power network when the external power network is electrically connected to the second output.

9. The device of claim 1 wherein the inverter is a pulse width modulated inverter and the inverter includes one or more filter inductors.

10. The device of claim 1 wherein the second output is configured to be connected to the at least one of non-critical loads and an external power network via an over-current protection device.

11. A device configured to operate proximate to a structure for controlling power flow between at least one energy source and power network comprising an internal power network and an external power network, the device comprising:
a power converter configured to receive power from the at least one energy source, the power converter coupled to a battery;
an inverter coupled to the battery that is configured to output AC power for distribution to the power network;
a first output configured to be connected to a first load of the internal power network, the first output coupled to the inverter to receive output AC power from the inverter;
a second output configured to be connected to a second load of the internal power network and to the external power network, the second output coupled to the inverter to receive output AC power from the inverter;
at least one current sensor operable to sense current flow between the internal power network and the external power network, the at least one current sensor having a sufficient bandwidth to produce current data of the current flow between the internal power network and the external power network in substantially real-time; and
a controller configured to control a current output of the inverter to the first output and second output to prevent all current flow to and from the external power network while the inverter is electrically connected to the external power network via a conductive pathway, wherein controlling the current output of the inverter includes utilizing the current data from the at least one current sensor and a look up table to control a current sine waveform between the internal power network and the external power network in substantially real-time, the look up table specifying the current output of the inverter as a function of the sensed current flow data, wherein the look up table output is zero where the current flow to the external power network is zero and transitions to unity as the current flow to the external power network becomes increasingly negative, the controller further operable to simultaneously perform one of utilizing energy from the at least one energy source to charge the battery and provide power to the internal power network and utilizing energy from the battery to provide power to the internal power network; and
said controller utilizes a phase lock loop and a multiplier; and
said controller is implemented with a field programmable gate array.

12. The device of claim 11, wherein the power network comprises two independent phases;
wherein the at least one current sensor comprises a first current sensor that senses current of the first phase between the internal power network and the external power network and a second current sensor that senses current of the second phase between the internal power network and the external power network;
wherein the inverter comprises a first independent phase that controls current flow to and from the first phase of the external power network and a second independent phase that controls current flow to and from the second phase of the external power network;
wherein the first current sensor is configured to control the first independent phase of the inverter and the second current sensor is configured to control the second independent phase of the inverter; and
wherein the controller is configured to control a current output of the first independent phase of the inverter and the second independent phase of the inverter and is further operable to utilize information from the first current sensor and the second current sensor to prevent all current flow to and from the two independent phases of the external power network, while the inverter is electrically connected to the external power network via a conductive pathway.

* * * * *